June 15, 1926.
P. CATUCCI
1,588,873
THROW-OFF REEL
Filed July 22, 1922
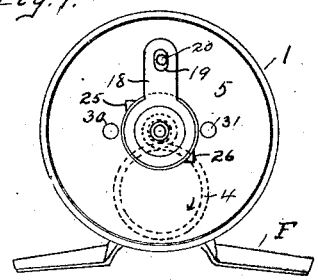
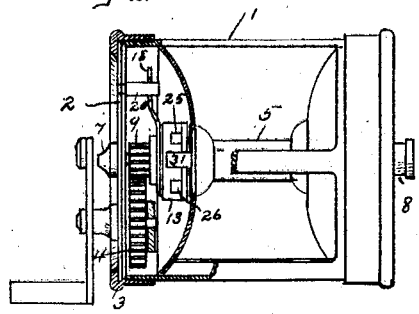
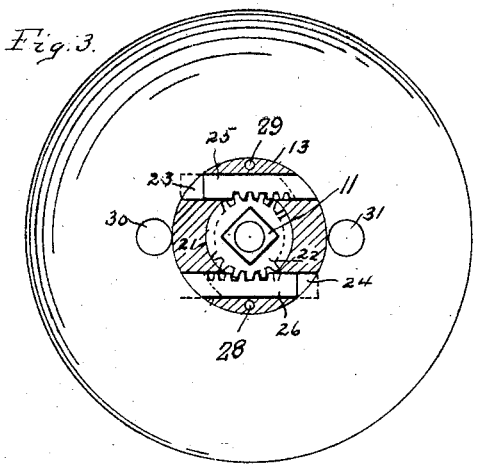
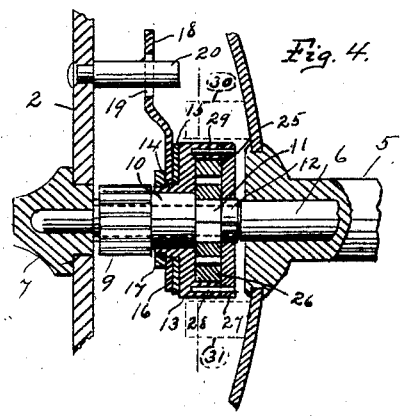
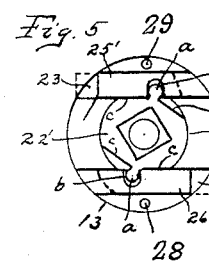
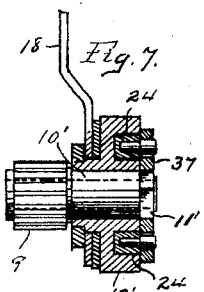
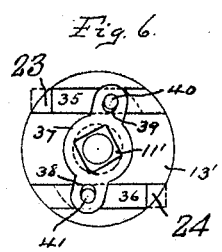
Pliny Catucci
INVENTOR.
By Louis M. Sanders
ATTORNEY Patented June 15, 1926.

1,588,873

UNITED STATES PATENT OFFICE.

PLINY CATUCCI, OF NEWARK, NEW JERSEY.

THROW-OFF REEL.

Application filed July 22, 1922. Serial No. 576,715.

The object of my invention is to provide an ordinary fishing reel of the multiple gear type with automatic throw-off mechanism, whereby the reel spool may be readily disconnected from the driving gears so as to become what is known in the art as a "free spool reel" and yet reconnected by the mere act of turning the reel crank. Throw-off mechanisms for the purpose are quite common in the art, but because of the extreme smallness and delicacy of the parts, they have not given the general satisfaction desired. My improvement, therefore, has for its main object the general simplification of the throw-off mechanism, with positive means for connecting the spool with the drive gear, so that there shall be no slipping engagement between the connecting parts.

In carrying out my improvements, I make use of the structures set forth in the following detailed description, taken in connection with the accompanying drawing, wherein;

Fig. 1 is an end elevational view of the reel frame and spool with the head plate removed to expose the location of the improved throw-off mechanism.

Fig. 2 is a side elevation, partly in section.

Fig. 3 is an enlarged end elevation of the spool, showing the throw-off mechanism.

Fig. 4 is a longitudinal sectional view of the same.

Fig. 5 is a view similar to Fig. 3, showing a slight modification of the device and drawn to a smaller scale.

Figs. 6 and 7 illustrate in plan and section, a still further modification.

The reel frame 1, with its head plate 2, head ring 3, and driving gear 4 may be of any preferred type. The spool 5 has its spindle 6 supported in the usual center bearings 7 and 8 mounted in the head and back plates of the reel. Rotary motion of the drive gear 4 is communicated to the spool through a small pinion 9 upon the reduced part of the spindle so that it may rotate independently thereof, and the improvement resides in the means for connecting said pinion to and disconnecting the same from the spool.

The pinion 9 is made from what is known in the art as pinion rod, is a long rod fluted with gear teeth and which may be cut into suitable lengths. In the present case, the rod is formed to produce the pinion 9 in mesh with the driving gear 4, a cylindrical section 10, a squared section 11 and a cylindrical hub section 12.

Mounted upon the cylindrical section 10 to rotate freely thereon, is a drum 13, having a hub 14 upon which is mounted a friction element such as a felt or leather washer 15 and a spring washer 16 both being held in frictional engagement against the back of the drum 13 by means of a collar 17 riveted to the hub 14.

The washer 16 has a laterally extending offset arm 18, having a slot 19 in the end thereof in position to slip over a fixed stud 20, located on the inner face of the head plate 2.

The face of the drum 13 is provided with a circular cavity 21 extending in to the depth of the squared portion 11 of the pinion rod section and on this squared portion is mounted a pinion 22; also in the face of the drum 13 are the two lateral channels 23 and 24 which serve as guides for two rack members 25 and 26, which are provided with rack teeth to engage the teeth of the pinion 22. A circular plate 27 is fitted upon the cylindrical hub 12 to enclose the pinion 22 and the racks 25 and 26 within the drum, said plate being held in place by two dowels 28, 29.

It will be noted that the two racks 25 and 26 have a limited number of teeth therein, and it is found in practice that four teeth are sufficient to provide the requisite reciprocating motion of said racks. The blank faces of the racks serve as stops to limit their motion in either direction by the contact of the teeth of the pinion 22 therewith, thus when the pinion 9 and the drum 13 are rotated, the racks 25 and 26 will be either projected transversely across the surface of the drum or withdrawn into the channels 23 and 24.

Upon the end of the spool 5, and spaced apart just outside of the circumference of the drum 13 are two projecting posts 30 and 31, set in the path of the racks 25 and 26 when said racks are projected from the cylindrical face of the drum, so that when projected by the rotation of the pinion 9 relative to said drum, the engagement of the ends of the racks 25 and 26 with the posts 30 and 31 will cause a simultaneous rotation of the spool; but when said racks are withdrawn into the channels 23 and 24 the spool is permitted to rotate independently.

In operation, the reel is mounted upon the fishing rod by means of the foot plate F as is well understood. The act of rotating the crank to turn the gear 4 in a clockwise direction will rotate the pinions 9 and 22 in a counter-clockwise direction, and if the movement of the drum 13 were unrestrained it would also rotate along with the pinion 9, however, the slight frictional restraint offered to the rotation of the drum 13 by the washers 15 and 16 will cause a slight relative movement of the pinion 22 within said drum until such time as the racks 25 and 26 are projected from their channels to the limit.

Further rotation of the pinion 22 will be accompanied by the rotation of the drum 13 until the exposed ends of the racks 25 and 26 engage the posts 30 and 31 in the end of the spool, when, of course, the spool, drum and pinion will all rotate together in a counter-clockwise direction with only a slight drag thereon offered by the friction discs 15 and 16, which is so slight as to be negligible.

A counter-clockwise movement of the gear wheel 4 will produce a clockwise movement of the pinions 9 and 22.

The slight restraint to the movement of the drum 13 offered through the friction discs 15 and 16, bearing upon the back of the drum 13, is sufficient to arrest the rotation of the drum 13 until such time as the two racks 25 and 26 are completely withdrawn within the channels 23 and 24 and out of the path of the two posts 30 and 31, freeing the reel from further operative connections with the driving gears, and permitting the line to freely pay out from the spool as in the act of casting.

The slightest movement, however, of the crank and drive gear 4 in a clockwise direction will serve to project the racks 25 and 26 to their outer limit where they will again engage the posts 30 and 31 as the spool 5 rotates, and thus arrest the further reverse rotation of the spool; while a continued rotation of the drive gear 4 will result in driving the spool 5 to wind in the line.

In Fig. 5 I have shown a slight modification of the rack and pinion mechanism, in which the drum 13 with its circular cavity 21 and lateral channels 23 and 24 are identical with those illustrated in Fig. 3. For the pinion 22 I substitute a disc 22', having diametrically disposed teeth $a$, $a$, projecting into the channels 23 and 24 respectively and into engagement with notches $b$, $b$, in the sides of the two racks 25' and 26'; since the rotative movement of the disc 22' is comparatively small in order to move the racks 25' and 26' to the limit of their movements, a single tooth construction as shown is adequate.

It will be noted that the disc 22' has two flattened and inclined faces, as $c$, $c$ on each side of the teeth $a$, $a$. These flattened surfaces alternately come in contact with the adjacent faces of the racks 25' and 26' at the ends of their throws and serve to arrest further movement of the disc 22' relative to the drum 13.

In Figs. 6 and 7, I have shown the drum 13' as provided with the channels 23 and 24 in which small square bolts 35 and 36 corresponding to the above mentioned racks 25 and 26 may slide. The pinion 9 has its shank 10' turned cylindrical to the full width of the thickness of the drum 13', in which it is mounted to rotate.

The pinion hub 11' is squared to receive a two armed lever 37, the arms of which are provided with the slots 38 and 39 which engage the pins 40 and 41 projecting from the exposed faces of the bolts 35 and 36. The slots 38 and 39 are made of just the right length so that the engagement with their remote ends with the two pins 40 and 41 respectively will limit the projection of the bolts 35 and 36 from their channels. The lever 37 may be secured to the squared hub 11, in any convenient way, as for example: riveting the head of said hub over the face of said lever. As thus constructed, the lever serves to prevent the escape of the bolts 35 and 36 from their channels and to retain all the parts together as a unitary structure.

Numerous other methods of projecting the two racks 25 and 26 from the face of the drum 13 could be shown but it is believed these are sufficient to illustrate the principle of the invention; for example, one of the racks 25 and 26 together with its groove 23 or 24 could be omitted and still it would be operative, or a plurality of pairs of posts 30, 31 could be fixed around the end of the spool 5 in position for engagement with the projecting ends of the racks 25 and 26 and still come within the scope of the invention. These, however, are mechanical details and slight changes in them may be made according to the mechanical judgment of the manufacturer and still come within the scope of the invention.

I claim:

1. In a fishing reel, the combination with a reel frame, a spindle journalled therein, a normally free running spool mounted on said spindle, a pinion loosely mounted upon said spindle, and a driving gear engaging said pinion, of a drum mounted upon the hub of said pinion, a pair of reciprocating bolts in said drum, means upon said hub for reciprocating said bolts, and a plurality of posts extending from the end of said spool into the path of said bolts, whereby the rotation of said pinion in one direction will project said bolts into engagement with said posts, and rotation in the opposite direction will withdraw said bolts into said drum and out of the path of said posts.

2. In a fishing reel, the combination with a normally free running spool having a spindle, a pinion loosely mounted upon the end of the spindle, and a driving gear meshing with said pinion, of means for automatically connecting said pinion with said spool and for disconnecting the same therefrom, said means comprising a pair of posts upon said spool, a pair of bolts slidably supported upon the hub of said pinion, and means connecting said pinion and said bolts whereby rotation of said pinion in one direction will project said bolts into the path of said posts, and rotation of said pinion in the opposite direction will withdraw said bolts from the path of said posts and permit free rotation of said spool.

3. In a fishing reel, the combination with a reel frame and a spool rotatably mounted therein, of a pair of posts projecting from the flange of said spool, a pair of reciprocable bolts mounted adjacent to and normally lying within the path of said posts, and restraining means connected with the reel driving gear and reel frame to cause projection of said bolts into the path of said posts or to withdraw the same therefrom.

4. In a fishing reel, the combination with a reel frame and a spool having a spindle rotatably mounted therein, of a pair of posts projecting from the end of said spool, a pinion mounted upon the spindle of said spool, a pair of longitudinally slidable members mounted upon said pinion, and restraining means connecting said pinion with said members and with said reel frame to porject them into the path of said posts or to withdraw them therefrom.

5. In a fishing reel, the combination with a free running spindle having a spool fixed thereon, and a pinion loosely mounted upon the spindle, of a post projecting from the end of said spool, a bolt carried by said pinion, and frictional means connecting said bolt and said pinion whereby the rotation of said pinion in one direction will project said bolt in the path of said posts, and rotation in the opposite direction will withdraw said bolt from said path.

6. In a fishing reel, the combination with a reel frame, a normally free running spindle mounted therein, a spool rigidly mounted upon said spindle, and a pinion sleeved upon said spindle, of a pair of posts projecting from the end of said spool and frictional restraining means mounted upon said pinion for positively engaging said posts to cause said pinion and spool to rotate together or to be disengaged therefrom to permit free running of the spool.

7. In a fishing reel, the combination with a reel frame, and a free running spindle having a spool mounted to rotate therein, of a pinion loosely mounted upon said spindle, a drum rotatably mounted upon the hub of said pinion, a pair of bolts slidably mounted in the face of said drum, said bolts being provided with rack teeth in their adjacent faces, a pinion mounted upon the hub of said first named pinion with its teeth in engagement with the rack teeth, whereby the rotation of said pinions in one direction will move said bolts into the path of said posts to cause a simultaneous rotation of said spool, and rotation of said pinions in the opposite direction will cause withdrawal of said bolts from the path of said posts to permit the free running of the spool.

PLINY CATUCCI.